(12) United States Patent
Nagasawa

(10) Patent No.: US 11,702,031 B2
(45) Date of Patent: Jul. 18, 2023

(54) EXTERIOR PROTECTION APPARATUS FOR VEHICLE

(71) Applicant: SUBARU CORPORATION, Tokyo (JP)

(72) Inventor: Isamu Nagasawa, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/448,483

(22) Filed: Sep. 22, 2021

(65) Prior Publication Data
US 2022/0097648 A1    Mar. 31, 2022

(30) Foreign Application Priority Data

Sep. 25, 2020  (JP) .............................. JP2020-160285

(51) Int. Cl.
*B60R 21/36* (2011.01)
*B60R 21/00* (2006.01)
*B60R 21/34* (2011.01)

(52) U.S. Cl.
CPC ...... *B60R 21/36* (2013.01); *B60R 2021/0004* (2013.01); *B60R 2021/346* (2013.01)

(58) Field of Classification Search
CPC . B60R 21/2334; B60R 21/2338; B60R 21/34; B60R 21/36; B60R 2021/23388; B60R 2021/23386; B60R 2021/23384; B60R 2021/23382; B60R 2021/346
See application file for complete search history.

(56) References Cited

U.S. PATENT DOCUMENTS

| | | | |
|---|---|---|---|
| 8,016,066 B1 * | 9/2011 | Boxey ..................... | B60R 21/36 180/274 |
| 9,650,014 B2 * | 5/2017 | Suemune ................ | B60R 21/36 |
| 11,242,028 B2 * | 2/2022 | Nagasawa ............... | B60R 21/36 |
| 11,351,956 B2 * | 6/2022 | Nagasawa ............... | B60R 21/36 |
| 11,358,563 B2 * | 6/2022 | Nagasawa ............. | B60R 19/205 |
| 2003/0192731 A1 * | 10/2003 | Kikuchi .................. | B60R 21/36 180/274 |

(Continued)

FOREIGN PATENT DOCUMENTS

| | | | | |
|---|---|---|---|---|
| DE | 10062561 A1 * | 8/2001 | ............. | B60R 21/36 |
| DE | 102012222006 A1 * | 8/2013 | ............. | B60R 21/36 |

(Continued)

*Primary Examiner* — Barry Gooden, Jr.
(74) *Attorney, Agent, or Firm* — Troutman Pepper Hamilton Sanders LLP

(57) ABSTRACT

An exterior protection apparatus for a vehicle includes an exterior airbag device, a collision detector, and a controller. The exterior airbag device includes a bag body, and an inflator configured to expand the bag body over a hood of a vehicle body of the vehicle in a state of having a width corresponding to a vehicle width of the vehicle body of the vehicle. The collision detector is configured to predict or detect a collision between the vehicle body and a person outside the vehicle. The controller is configured to cause the bag body of the exterior airbag device to be expanded in a case where the collision detector predicts or detects the collision. The exterior airbag device includes a flexible crossing member configured to extend along a direction of the vehicle width on an upper surface of the bag body widely expanded.

11 Claims, 8 Drawing Sheets

(56) References Cited

U.S. PATENT DOCUMENTS

| | | | |
|---|---|---|---|
| 2004/0074688 A1* | 4/2004 | Hashimoto | B60R 21/2155 180/274 |
| 2004/0262893 A1* | 12/2004 | Kempf | B60R 21/34 180/274 |
| 2006/0151228 A1* | 7/2006 | Kalliske | B60R 21/2338 180/274 |
| 2006/0249943 A1* | 11/2006 | Bauer | B60R 21/231 280/736 |
| 2009/0084620 A1* | 4/2009 | Matsuura | F15B 15/22 180/69.2 |
| 2013/0200603 A1* | 8/2013 | Bergenheim | B60R 21/2338 280/762 |
| 2013/0333972 A1* | 12/2013 | Rydsmo | B60R 21/36 180/274 |
| 2014/0027195 A1* | 1/2014 | Kalliske | B60R 21/34 180/271 |
| 2015/0000994 A1* | 1/2015 | McLundie | B60R 21/34 180/274 |
| 2016/0288764 A1* | 10/2016 | Suzuki | B60R 21/36 |
| 2017/0282846 A1* | 10/2017 | Nagasawa | B60R 21/36 |
| 2018/0099638 A1* | 4/2018 | Minei | B60R 21/36 |
| 2019/0071050 A1* | 3/2019 | Farooq | B60R 21/36 |
| 2019/0366971 A1* | 12/2019 | Nakamura | B60R 21/36 |
| 2021/0197755 A1* | 7/2021 | Nagasawa | B60R 21/0134 |
| 2022/0097647 A1* | 3/2022 | Nagasawa | B60R 21/36 |
| 2022/0097648 A1* | 3/2022 | Nagasawa | B60R 21/36 |

FOREIGN PATENT DOCUMENTS

| | | | | |
|---|---|---|---|---|
| DE | 102012006428 A1 | * | 10/2013 | ......... B60R 21/2338 |
| EP | 1992526 A2 | * | 11/2008 | ........... B60R 21/231 |
| EP | 2548772 A1 | * | 1/2013 | ............. B60R 21/36 |
| EP | 2570307 A1 | * | 3/2013 | ............. B60R 21/36 |
| JP | 2017-178205 A | | 10/2017 | |
| JP | 2021107211 A | * | 7/2021 | ........... B60R 19/205 |

\* cited by examiner

FRONT ←——→ REAR

FRONT ←⎯⎯⎯→ REAR

FRONT ← → REAR

RIGHT ← → LEFT

FRONT ←——→ REAR

EXTERIOR PROTECTION APPARATUS FOR VEHICLE

CROSS-REFERENCE TO RELATED APPLICATION

The present application claims priority from Japanese Patent Application No. 2020-160285 filed on Sep. 25, 2020, the entire contents of which are hereby incorporated by reference.

BACKGROUND

The disclosure relates to an exterior protection apparatus of a vehicle.

There may exist other movable bodies, pedestrians, cyclists, riders, etc., on roads and other locations outside a vehicle. The vehicle may possibly collide with such a person outside the vehicle or the like, during traveling, stopping, or parking. In consideration of this, installing an exterior protection apparatus to a vehicle has been studied (Japanese Unexamined Patent Application Publication (JP-A) No. 2017-178205).

SUMMARY

An aspect of the disclosure provides an exterior protection apparatus for a vehicle including an exterior airbag device, a collision detector, and a controller. The exterior airbag device includes a bag body, and an inflator configured to expand the bag body over a hood of a vehicle body of the vehicle in a state of having a width corresponding to a vehicle width of the vehicle body of the vehicle. The collision detector is configured to predict or detect a collision between the vehicle body and a person outside the vehicle. The controller is configured to cause the bag body of the exterior airbag device to be expanded in a case where the collision detector predicts or detects the collision. The exterior airbag device includes a flexible crossing member configured to extend along a direction of the vehicle width on an upper surface of the bag body widely expanded.

An aspect of the disclosure provides an exterior protection apparatus for a vehicle including an exterior airbag device, a collision detector, and circuitry. The exterior airbag device includes a bag body, and an inflator configured to expand the bag body over a hood of a vehicle body of the vehicle in a state of having a width corresponding to a vehicle width of the vehicle body of the vehicle. The collision detector is configured to predict or detect a collision between the vehicle body and a person outside the vehicle. The collision detector includes at least a camera or a sensor for detecting the contact between the vehicle body and the movable body. The circuitry is configured to cause the bag body of the exterior airbag device to be expanded in a case where the collision detector predicts or detects the collision. The exterior airbag device includes a flexible crossing member configured to extend along a direction of the vehicle width on an upper surface of the bag body widely expanded.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to explain the principles of the disclosure.

DETAILED DESCRIPTION

As to vehicles, there are ideas to expand an airbag for a person outside a vehicle, for example, on a hood, or in front of a windshield or a pillar at each right and left part of the windshield, instead of moving a hood as in JP-A No. 2017-178205. Employing such an exterior airbag device enables avoiding a direct collision of a person outside the vehicle with a vehicle body. However, this may not be enough to protect a person outside a vehicle.

An exterior protection apparatus of a vehicle is desired to be further improved for protecting a person outside a vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1A:
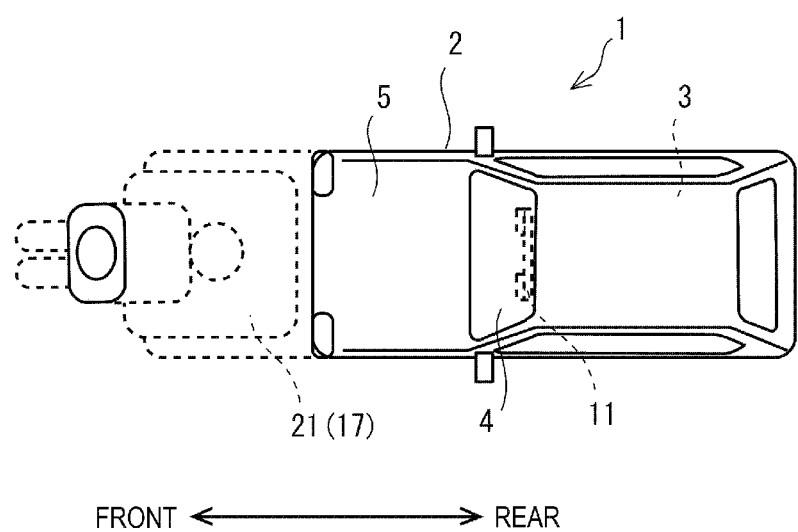
FIGS. 1A and 1B are diagrams of an automobile according to an embodiment of the disclosure.
Figure 1B:
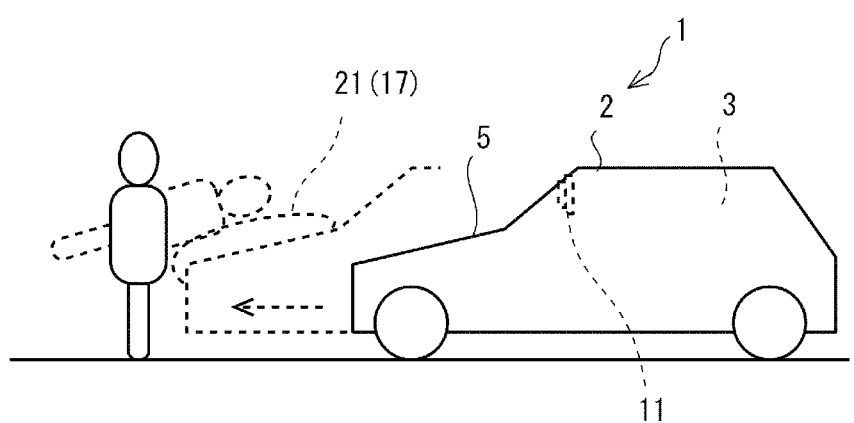

FIGS. 1A and 1B are diagrams of an automobile 1 according to an embodiment of the disclosure.

FIG. 1A is a top view of the automobile 1. FIG. 1B is a left side view of the automobile 1. FIGS. 1A and 1B illustrate a pedestrian as a person outside the automobile 1, in addition to the automobile 1. There may be cases in which a person other than the pedestrian, such as a cyclist or a rider, exists outside the automobile 1. Such a person outside the vehicle may cross a road in front of the automobile 1 that is travelling, in some cases. The automobile 1 may possibly collide with the person about to pass in front thereof.

The automobile 1 in FIGS. 1A and 1B is an example of a vehicle. The automobile 1 includes a vehicle body 2. A windshield 4 is provided in front of a vehicle cabin 3 of the vehicle body 2. A hood 5 is provided in a front part of the vehicle body 2 forward of the windshield 4 to be openable and closable.

Figure 2:
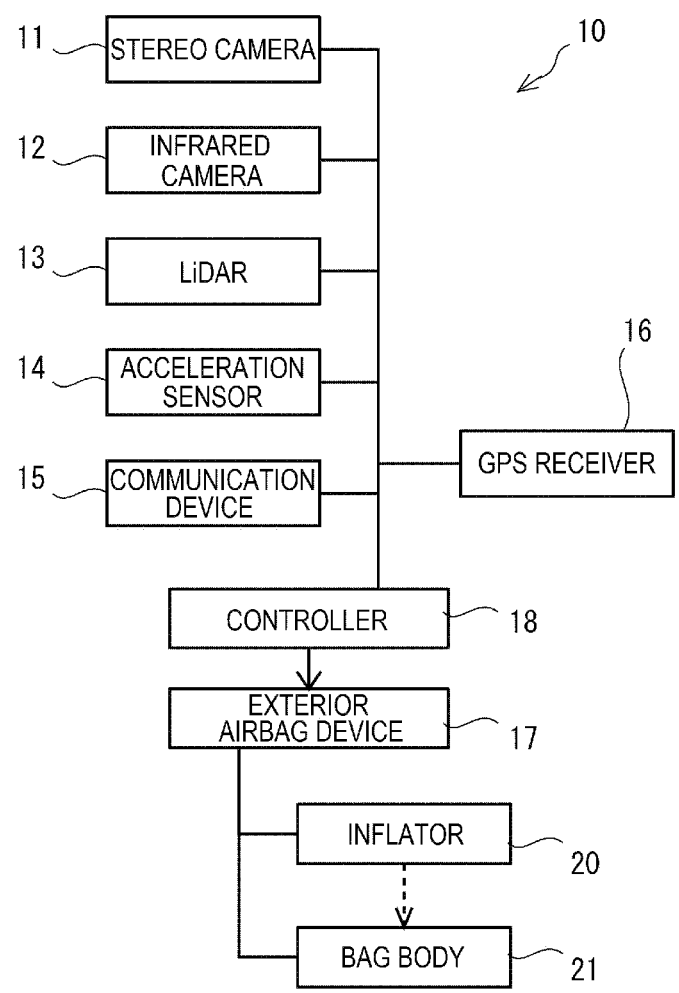
FIG. 2 is a block diagram of an exterior protection apparatus of the automobile in FIGS. 1A and 1B.

FIG. 2 is a block diagram of an exterior protection apparatus 10 of the automobile 1 in FIGS. 1A and 1B.

The exterior protection apparatus 10 in FIG. 2 includes a stereo camera 11, an infrared camera 12, a LiDAR 13, an acceleration sensor 14, a communication device 15, a GPS receiver 16, an exterior airbag device 17, and a controller 18 to which these components are coupled. These sensors and devices of the exterior protection apparatus 10 may be coupled to a CPU serving as the controller 18, over a vehicle network (not illustrated).

The stereo camera 11 faces forward, for example, at a front part of the vehicle cabin 3, as illustrated in FIGS. 1A and 1B. The stereo camera 11 includes a plurality of imaging devices arranged in the vehicle width direction. The stereo camera 11 captures images of a person and so on outside the vehicle by the plurality of the imaging devices. The stereo camera 11 may calculate a direction and a distance based on the vehicle body 2 of the captured person outside the vehicle. The stereo camera 11 may calculate, based on a position of the person outside the vehicle that is a subject in images captured by the plurality of the imaging devices, the direction and the distance to the subject by triangulation, for example. The stereo camera 11 may calculate (i) whether the subject moves, (ii) a moving direction of the subject, (iii) a moving speed of the subject, and the like, based on a change in position of the subject in the images which are captured at different times.

The infrared camera 12 faces forward at the front part of the vehicle cabin 3, like the stereo camera 11, for example. The infrared camera 12 obtains infrared images by capturing a person and so on outside the vehicle.

The LiDAR 13 faces forward, for example, at the front part of the vehicle body 2. The LiDAR 13 emits light forward, and acquires a direction of a subject, a distance to the subject, the speed of the subject, and the like, based on light reflected from the person outside the vehicle ahead of the vehicle body 2.

The acceleration sensor 14 is provided on the vehicle body 2. Acceleration that is applied to the acceleration sensor 14 is detected. When the vehicle body 2 comes into contact with a movable body, such as a person, the acceleration sensor 14 detects a large acceleration that does not occur during normal running. In this situation, the acceleration sensor 14 may output a collision detection signal. In this case, the acceleration sensor 14 functions as a collision detector that predicts or detects contact between the vehicle body 2 and other movable body.

The communication device 15 wirelessly communicates with other communication devices 15 of other movable bodies (for example, other automobile 1 and a pedestrian), a base station disposed along a road, and the like. The communication device 15 may acquire current positions, moving directions, moving speeds, and the like, of the other movable bodies from the other communication devices 15.

The GPS receiver 16 receives a radio wave from a GPS satellite and the like, and acquires a current position, a moving speed, and the like, of the own vehicle.

The exterior airbag device 17 includes a bag body 21 and an inflator 20. The bag body 21 is configured to be expanded over an outer surface of the vehicle body 2 of the automobile 1. The inflator 20 expands the bag body 21. The bag body 21 may have a smooth surface formed of, for example, at least one selected from the group consisting of nylon and other resin fibers. The bag body 21 may be expanded over the hood 5 at the front part of the vehicle body 2, for example, as illustrated in FIGS. 1A and 1B. In a situation in which an upper part of the body of a person outside the vehicle, who is hit by the forefront of the vehicle body 2, falls over to the front part of the vehicle body 2, the bag body 21 is expanded over the hood 5 between the upper body and the hood 5. The body of the person outside the vehicle, who is hit by the vehicle body 2 and falls over to the hood 5, hardly comes into direct contact with the hood 5. The expanded bag body 21 is bent or compressed by the body weight of the person outside the vehicle, whereby a strong impact hardly acts on the human body. The expanded bag body 21 absorbs an impact that acts on the person outside the vehicle.

The controller 18 is, for example, a CPU. For example, the controller 18 may be provided in the automobile 1 as a CPU dedicated to the exterior airbag device 17 or may be provided in the automobile 1 as a CPU of vehicle interior and exterior protection devices of the automobile 1. The CPU reads and executes a program in a storage, such as a ROM. Thus, the CPU functions as the controller 18 of at least the exterior airbag device 17 for protecting a person outside the vehicle. The controller 18 of the exterior airbag device 17 acquires information of a pedestrian, a cyclist, a rider, and so on, who are in the course of the automobile 1 or are about to enter the course of the automobile 1, from collision detectors such as the stereo camera 11, the infrared camera 12, the LiDAR 13, the acceleration sensor 14, and the communication device 15. Upon predicting or detecting a collision with a person outside the vehicle based on the acquired information, the CPU controls expansion of the bag body 21 of the exterior airbag device 17.

Figure 3:
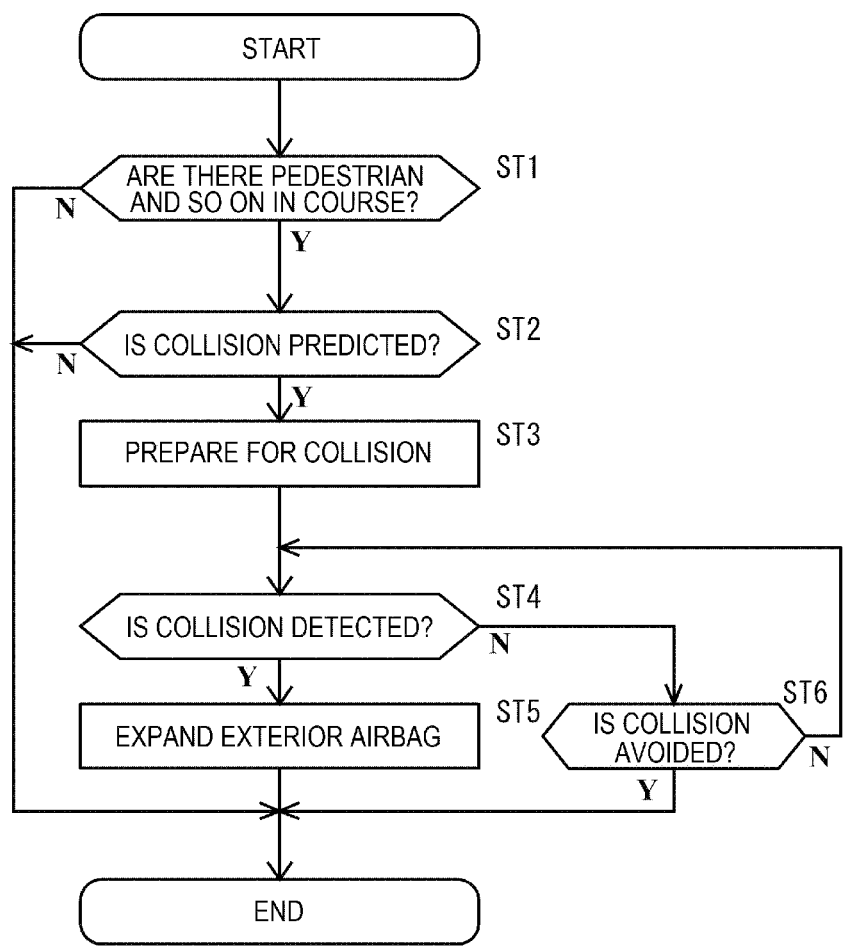
FIG. 3 is a flowchart of exterior protection control performed by a controller in FIG. 2.

FIG. 3 is a flowchart of exterior protection control performed by the controller 18 in FIG. 2.

The controller 18 repeats the exterior protection control in FIG. 3, for example, when the automobile 1 is traveling. The controller 18 executes the exterior protection control in FIG. 3 each time of acquiring new information.

In step ST1, the controller 18 determines whether a pedestrian or the like exists in the course of the own vehicle, based on newly acquired information of persons outside the vehicle. The controller 18 may determine whether a pedestrian or the like exists in the course of the own vehicle, for example, based on whether the position of a detected person outside the vehicle is in the course, or whether the moving direction of a detected person outside the vehicle crosses the course. In the case in which no pedestrian or the like exists in the course of the own vehicle, the controller 18 terminates the processing in FIG. 3. In the case in which a pedestrian or the like exists in the course of the own vehicle, the controller 18 advances the processing to step ST2.

In step ST2, the controller 18 predicts collision with a pedestrian or the like in the course of the own vehicle. The controller 18 may predict collision with a pedestrian or the like in the course of the own vehicle, for example, based on whether a difference between the time the own vehicle reaches the position of the pedestrian or the position expected to be crossed by the pedestrian, and the time the pedestrian reaches the crossing position, is a predetermined value or less. In the case of not predicting collision with the pedestrian or the like in the course of the own vehicle, the controller 18 terminates the processing in FIG. 3. In the case of predicting collision with the pedestrian or the like in the course of the own vehicle, the controller 18 advances the processing to step ST3.

In step ST3, the controller 18 starts preparation for collision with the pedestrian or the like in the course of the own vehicle. The controller 18 activates the exterior airbag device 17, for example. The exterior airbag device 17 prepares the inflator 20 to jet high-temperature high-pressure gas, for example, in response to an input ignition signal. For example, the exterior airbag device 17 adjusts an expansion start position or an expansion start direction of the bag body 21, if adjustable, so that the bag body 21 will be expanded at a part that is predicted to collide with the pedestrian.

In step ST4, the controller 18 detects the predicted collision with the pedestrian or the like, based on detection of collision performed by the acceleration sensor 14. In the case in which collision is detected by the acceleration sensor 14, the controller 18 advances the processing to step ST5. In the case in which no collision is detected by the acceleration sensor 14, the controller 18 advances the processing to step ST6.

In step ST5, the controller 18 causes the exterior airbag to be expanded. The controller 18 outputs an ignition signal to the exterior airbag device 17. The inflator 20 of the exterior airbag device 17 jets the high-pressure gas into the bag body 21. The bag body 21 is thus expanded over the hood 5.

In step ST6, the controller 18 determines whether the collision is avoided, based on information that is newly acquired after the determination in step ST1. The controller may determine whether the predicted collision with the pedestrian or the like is avoided, for example, based on whether the position of the person outside the vehicle, who is predicted to collide, deviates from the course, or whether the moving direction of the detected person outside the vehicle is changed so as to not cross the course. In the case in which the collision is avoided, the controller 18 terminates the processing in FIG. 3. In the case in which the collision is not avoided, the controller 18 returns the processing to step ST4. Then, the controller 18 repeats the processing in steps ST4 and ST6 until the collision is detected or avoided.

Such an automobile 1 of this embodiment can cause an airbag for a person outside the vehicle, to be expanded over the hood 5. Employing such an exterior airbag device 17 enables avoiding a direct collision of a person outside the vehicle with the vehicle body 2.

However, this may not be enough to protect a person outside a vehicle.

In one example, after a direct collision of a person outside the vehicle with the vehicle body 2 is avoided by the expanded bag body 21, the person is anticipated to slide rearward on the expanded bag body 21, resulting in falling off from the reached position. In the case of falling down to a side of the automobile 1, the person outside the vehicle may have a secondary collision with another automobile 1 that is traveling in an adjacent lane, or the like.

Figure 4:
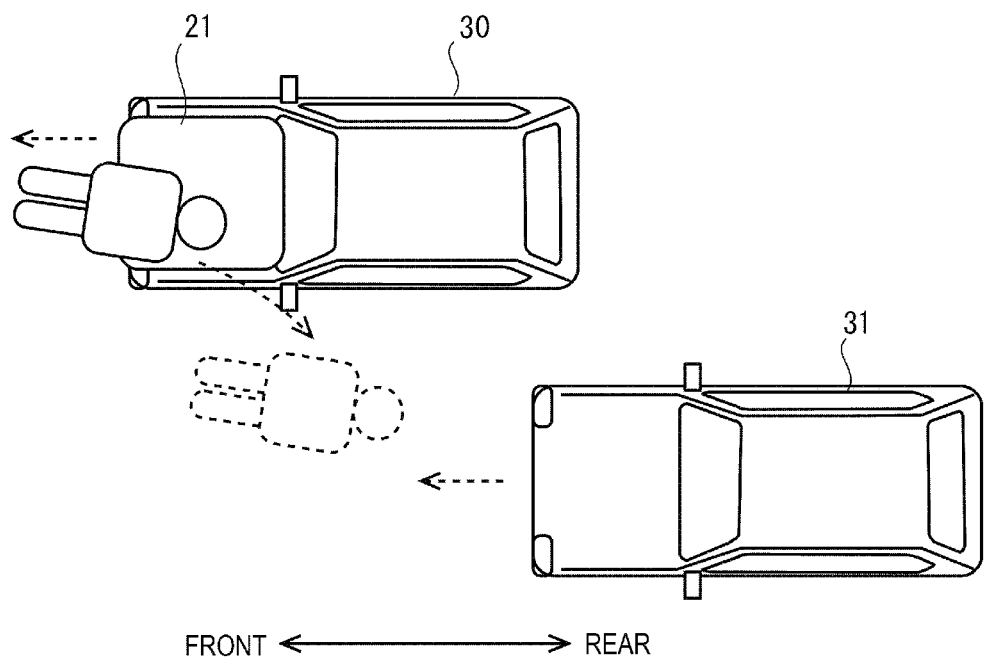
FIG. 4 is a diagram of a secondary collision that may occur on a person outside the vehicle, such as a pedestrian or a cyclist, who has collided with a first automobile.

FIG. 4 is a diagram of a secondary collision that may occur on a person outside the vehicle, such as a pedestrian or a cyclist, who has collided with a first automobile 30.

FIG. 4 illustrates a pedestrian outside the vehicle, a first automobile 30 having collided with the pedestrian, and a second automobile 31 that is about to pass beside the first automobile 30.

The pedestrian, who collides with the first automobile 30, is first hit at the forefront of the vehicle body 2 and then falls over the bag body 21 that is expanded over the hood 5. Then, the pedestrian having the collision may, for example, slide obliquely rearward on the bag body 21. In this case, the pedestrian having the collision may come into contact with another bag body 21, if it is expanded in front of the windshield 4, and may be able to stop at the contact position. In another case, after falling over the bag body 21 that is expanded over the hood 5, the pedestrian having the collision may move obliquely rearward due to the immediately prior movement in the direction of crossing the vehicle, and so on. In this situation, after moving obliquely rearward, the pedestrian having the collision may fall off from the bag body 21 that is expanded over the hood 5, to a side of the first automobile 30. The pedestrian who has fallen down may be further hit by the second automobile 31 that is about to pass beside the first automobile 30.

In view of this, the exterior protection apparatus 10 of the automobile 1 is desired to be further improved for protecting a person outside the vehicle.

Figure 5A:
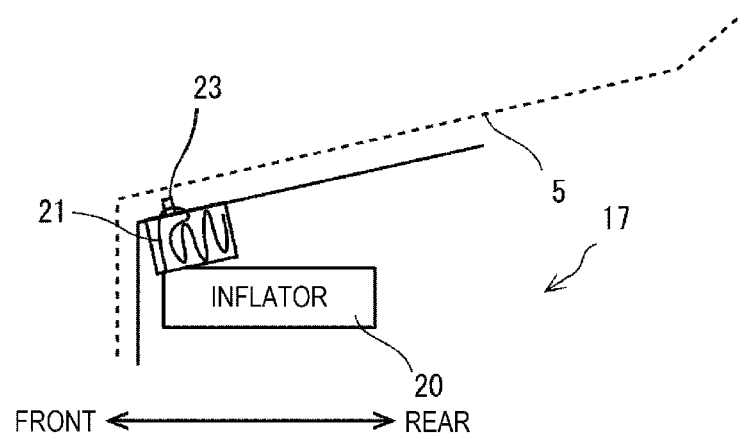
FIGS. 5A and 5B are diagrams of an exterior airbag device before being expanded according to an embodiment of the disclosure.
Figure 5B:
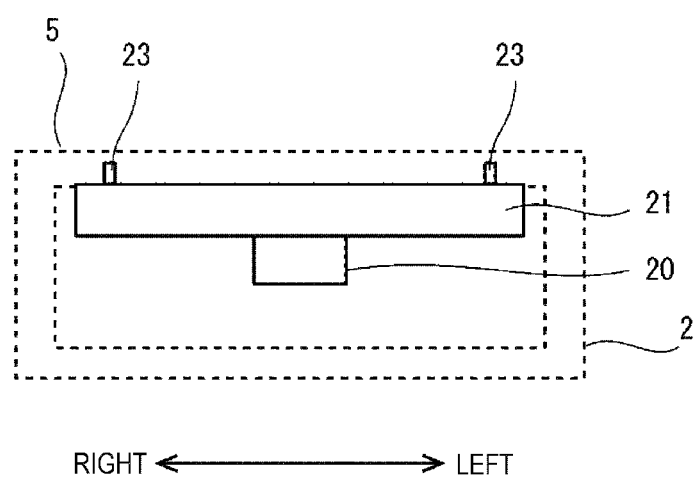

FIGS. 5A and 5B are diagrams of the exterior airbag device 17 before being expanded according to the embodiment of the disclosure.

FIG. 5A is a view of the exterior airbag device 17 before being expanded as viewed from a left side of the vehicle body 2.

FIG. 5B is a view of the exterior airbag device 17 before being expanded as viewed from a front side of the vehicle body 2.

Figure 6A:
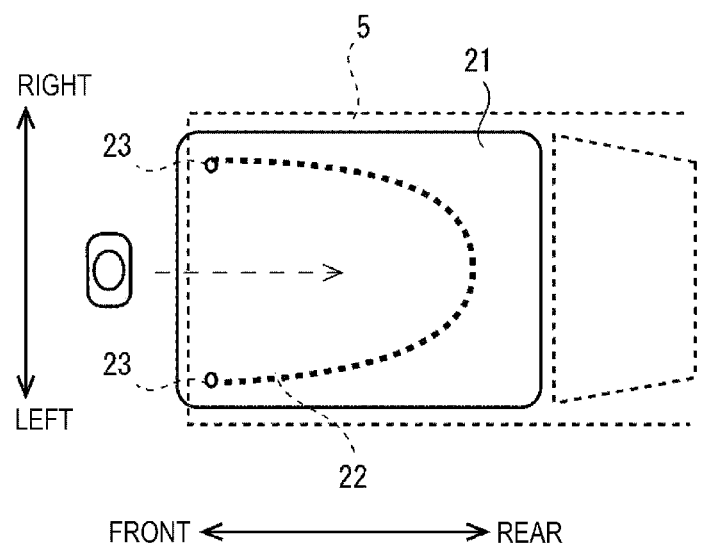
FIGS. 6A and 6B are diagrams of the exterior airbag device in FIGS. 5A and 5B, in which a wide bag body is expanded.
Figure 6B:
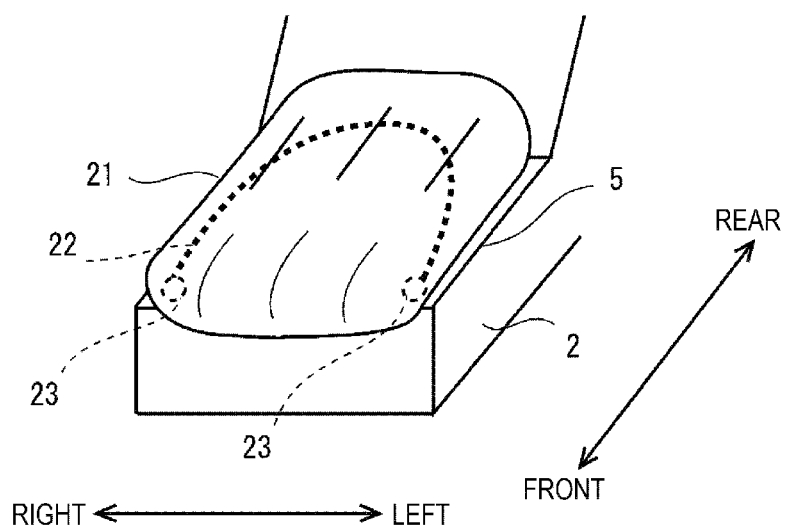

FIGS. 6A and 6B are diagrams of the exterior airbag device 17 in FIGS. 5A and 5B, in which the wide bag body 21 is expanded.

FIG. 6A is a view of the exterior airbag device 17 after being expanded as viewed from a top of the vehicle body 2.

FIG. 6B is a view of the exterior airbag device 17 after being expanded as viewed obliquely from an upper front side of the vehicle body 2.

The exterior airbag device 17 of this embodiment includes a bag body 21, an inflator 20, a tether 22, and paired right and left fixing members 23. In one embodiment, the tether 22 may serve as a "flexible crossing member".

The bag body 21 has an approximately quadrangular bag shape, as illustrated in FIG. 6A. The approximately quadrangular bag body 21 has a wide width approximately equal to the vehicle width of the vehicle body 2. The approximately quadrangular wide bag body 21 is folded in a case that is mounted at the front part of the vehicle body 2, as illustrated in FIG. 5A. The inflator 20 is provided close to the case. The inflator 20 is coupled to the approximately quadrangular wide bag body 21 and jets high-temperature high-pressure gas into the bag body 21. This causes the folded bag body 21 to be expanded rearward from the front part of the vehicle body 2 in such a manner as to overlie the hood 5 of the vehicle body 2 in the state of having a wide width corresponding to the vehicle width of the vehicle body 2. The bag body 21 is widely expanded so as to cover the whole hood 5.

The paired right and left fixing members 23 are provided in the front part of the vehicle body 2 with an interspace slightly narrower than the vehicle width, as illustrated in FIGS. 6A and 6B. The fixing members 23 fix, for example, a lower surface of the approximately quadrangular wide bag body 21, to the front part of the vehicle body 2. The bag body 21 is expanded rearward from the front part of the vehicle body 2 in the state of being fixed to the front part of the vehicle body 2 by the paired right and left fixing members 23. With this structure, the bag body 21 is widely expanded over the hood 5.

The tether 22 is provided inside the wide bag body 21 as illustrated in FIGS. 6A and 6B. The tether 22 is provided on an upper surface of the wide bag body 21. The tether 22 is configured to extend basically along the vehicle width direction in a curved state in which both ends are positioned forward of a center part. The both ends of the tether 22 are coupled to the paired right and left fixing members 23. Thus, the center part of the tether 22 is positioned on the upper surface of the widely expanded bag body 21, rearward above the paired right and left fixing members 23 to which the both ends are coupled. In the top view of the vehicle body 2 in FIG. 6A, the tether 22 extends along the vehicle width direction on the upper surface of the expanded wide bag body 21, in an area rearward of the positions where the bag body 21 is fixed by the fixing members 23. The tether 22 is configured to extend along the vehicle width direction so that it will be positioned rearward of the head of a person outside the vehicle who falls from the front side of the vehicle body 2 over the widely expanded bag body 21. The both ends of the tether 22 may be provided on the upper surface of the bag body 21, in the vicinity of the fixing members 23.

Figure 7A:
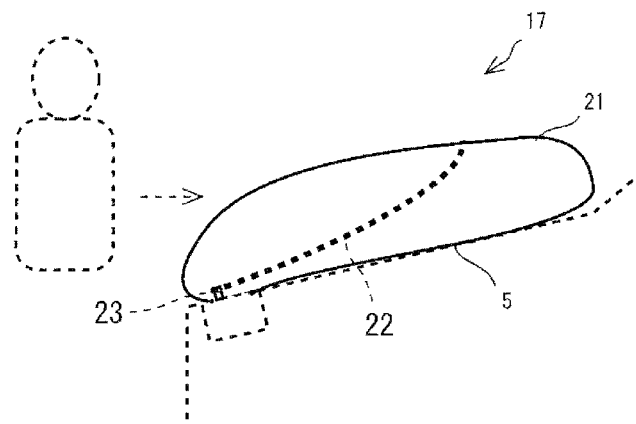
FIGS. 7A to 7C are diagrams of an example of the widely expanded bag body in FIGS. 6A and 6B, in the state of protecting a person outside the vehicle.
Figure 7B:
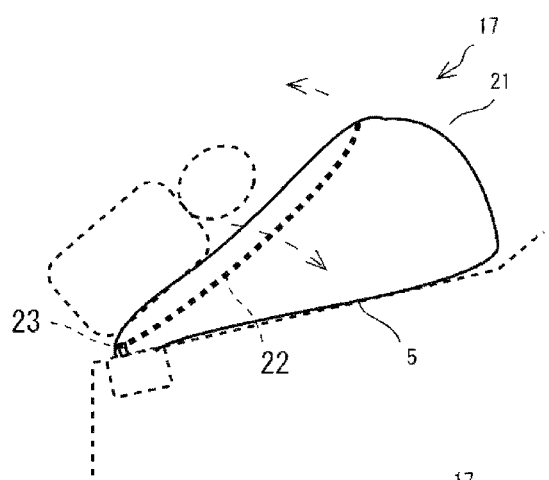
Figure 7C:
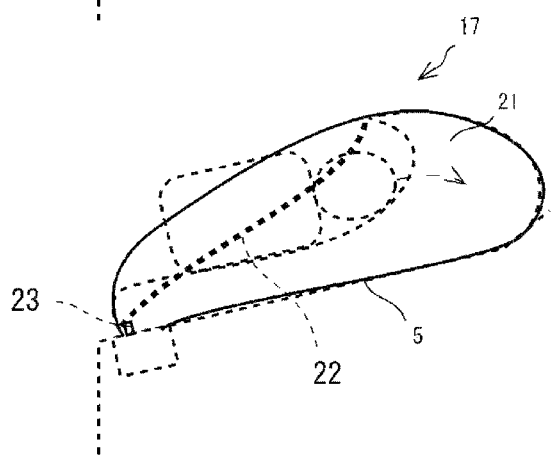

FIGS. 7A to 7C are diagrams of an example of the widely expanded bag body 21 in FIGS. 6A and 6B, in the state of protecting a person outside the vehicle.

FIG. 7A illustrates a state before collision with the person outside the vehicle occurs. Herein, the person outside the vehicle is at a distance forward of the vehicle body 2. The wide bag body 21 of the exterior airbag device 17 is already expanded in such a manner as to overlie the hood 5 of the vehicle body 2 while having a width corresponding to the vehicle width of the vehicle body 2. In this case, the controller 18 expands the bag body 21 of the exterior airbag device 17 based on prediction of a collision between the person outside the vehicle and the vehicle body 2. In addition, the tether 22 in which the both ends are coupled to the paired right and left fixing members 23 extends along the vehicle width direction on the upper surface of the bag body 21 expanded as in FIG. 7A.

FIG. 7B illustrates a state in which the person outside the vehicle begins to collide with the front part of the vehicle body 2. The body of the person outside the vehicle is hit at the forefront of the vehicle body 2 and then falls over the bag body 21, which is expanded over the hood 5. The expanded bag body 21 is compressed at the forward part by the weight of the person outside the vehicle falling thereover. The bag body 21, which is inflated by the high-pressure gas released from the inflator 20, deforms rearward downwardly as a whole, upon receiving the weight of the person outside the vehicle, although the gas is partially discharged from a discharge valve (not illustrated). In response to falling of the person outside the vehicle over the expanded wide bag body 21, the forward part of the bag body 21 on a forward inside of the tether 22 is recessed by the weight of the human body. In reaction to this, the rearward part of the bag body 21 on an outer side of the tether 22 deforms to further swell. Thus, the widely expanded bag body 21 on the rearward side of the tether 22 greatly swells behind the person outside the vehicle falling thereover and deforms in such a manner as to wrap the person outside the vehicle from behind.

For example, when the part on the forward center side of the bag body 21 is further recessed to have a depression upon further receiving the weight of the person outside the vehicle, the tether 22 deforms in such a manner as to be folded from right and left toward the center so that the right and left of the part receiving the weight will meet each other above the person outside the vehicle. In this case, the widely expanded bag body 21 wraps the person outside the vehicle falling thereover, from right and left, at the right and left of the part receiving the weight.

As a result, the person outside the vehicle, who has fallen over the bag body 21, is wrapped by the bag body 21, and the person outside the vehicle in this state stops moving on the bag body 21. After falling over the bag body 21 that is widely expanded over the hood 5, the person outside the vehicle is wrapped by the bag body 21, resulting in hardly moving and falling off in the right-left direction of the vehicle body 2.

When the person outside the vehicle moves toward the rear of the vehicle while maintaining the posture at the time of falling over, the tether 22, which is disposed so that it will be positioned rearward of the head of the person outside the vehicle falling over, comes above the head of the person outside the vehicle due to falling over of the person outside the vehicle. In this state, the person outside the vehicle then moves toward the rear of the vehicle and passes under the tether 22 that has been arched.

Thus, the person outside the vehicle is surrounded by a bag part of the bent bag body 21 that has the tether 22 as an opening, and is thus prevented from falling off from the hood 5 to right or left.

FIG. 7C illustrates a state in which the forward and center parts of the bag body 21 are compressed by the person outside the vehicle. As illustrated by the dashed line in FIG. 7C, the forward center part of the bag body 21 that directly receives the body weight of the person outside the vehicle is strongly compressed and is recessed. In reaction to this, as illustrated by the dashed line in FIG. 7C, the rearward part and the right and left parts of the bag body 21 swell relatively. The body of the person outside the vehicle falling over the bag body 21 is wrapped by the rearward part and the right and left parts of the bag body 21.

Figure 8:
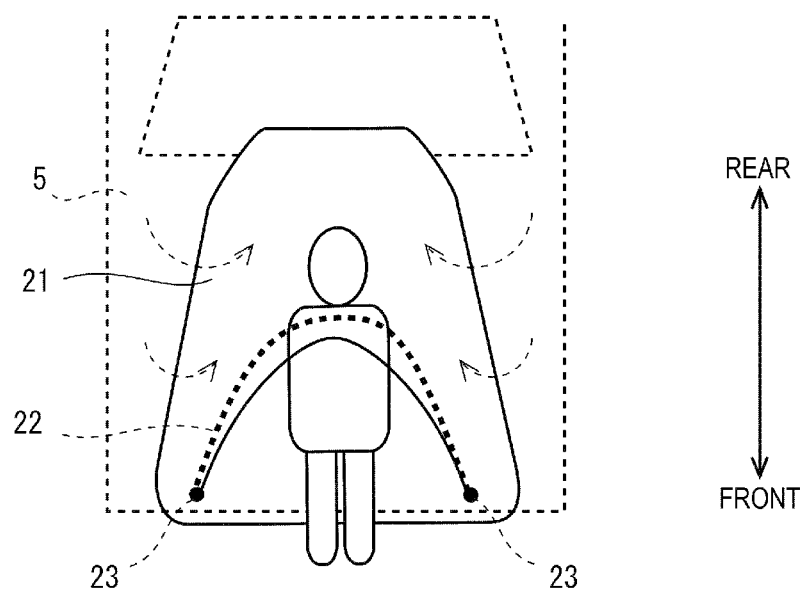
FIG. 8 is a diagram of the widely expanded bag body in the final state of protecting the person outside the vehicle as a result of deformation in FIGS. 7A to 7C.

FIG. 8 is a diagram of the widely expanded bag body in the final state of protecting the person outside the vehicle as a result of deformation in FIGS. 7A to 7C.

As described above, the tether 22 compresses around the forward center part of the bag body 21, in conjunction with the person outside the vehicle, by use of the weight of the person outside the vehicle, which causes swell of the other parts, i.e., the right and left parts and the rearward part, of the bag body 21. As a result, as illustrated in FIG. 8, the right and left parts and the rearward part of the bag body 21 deform in such a manner as to wrap the body of the person outside the vehicle falling over the bag body 21, from right, left, and rearward. The kinetic energy of the person outside the vehicle who is wrapped is transmitted to the vehicle body 2 via the bag body 21 and the fixing members 23. The body of the person outside the vehicle who is wrapped becomes hardly movable to right and left from the wrapped position.

As described above, in this embodiment, the exterior airbag device 17 is expanded when a contact is predicted or detected. The exterior airbag device 17 expands the bag body 21, which is expandable while having a wide width corresponding to the vehicle width of the vehicle body 2, over the hood 5 of the outer surface of the vehicle body 2 of the automobile 1. This enables avoiding a direct collision of the person outside the vehicle with the hood 5 of the vehicle body 2 and absorbing impact acting on the person outside the vehicle who is falling over to the hood 5.

Moreover, the tether 22 is configured to extend along the vehicle width direction on the upper surface of the wide bag body 21, which is expanded to overlie the hood 5 of the vehicle body 2. In response to falling of the person outside the vehicle over the expanded wide bag body 21, the part forward of the tether 22 of the bag body 21 is recessed by the weight of the human body. This makes the part rearward of the tether 22 of the bag body 21 easily deform to swell. Thus, the widely expanded bag body 21 on the rearward side of the tether 22 wraps the person outside the vehicle falling thereover, from behind. For example, when the part of the bag body 21 is further recessed upon further receiving the weight, the tether 22 easily deforms in such a manner as to be folded from right and left so that the right and left of the part receiving the weight will meet each other above the person outside the vehicle falling over. In this case, the widely expanded bag body 21 wraps the person outside the vehicle falling thereover, from right and left, at the right and left of the part receiving the weight. As a result, the person outside the vehicle, who has fallen over the bag body 21, is wrapped from rearward, right, and left by the bag body 21, and the person outside the vehicle in this state stops moving on the bag body 21. After falling over the bag body 21 that is widely expanded over the hood 5, the person outside the vehicle is wrapped by the bag body 21, resulting in hardly moving and falling off in the right-left direction of the vehicle body 2.

When the person outside the vehicle moves toward the rear of the vehicle while maintaining the posture at the time of falling over, the tether 22, which is disposed so that it will be positioned rearward of the head of the person outside the vehicle falling over, comes above the head of the person outside the vehicle due to falling over of the person outside the vehicle. In this state, the person outside the vehicle then moves toward the rear of the vehicle and passes under the tether 22 that has been arched. Thus, the person outside the vehicle is surrounded by a bag part of the bent bag body 21 that has the tether 22 as an opening, and is thus prevented from falling off from the hood 5 to right or left.

In this embodiment, the tether 22, which is provided on the upper surface of the wide bag body 21, is contained in the wide bag body 21. This makes it difficult for the person outside the vehicle to come into direct contact with the tether 22. The tether 22 hardly produces recesses and projections on the outer surface of the bag body 21.

In particular, in this embodiment, the wide bag body 21 widely expands over the hood 5 from the front part toward the rear part of the vehicle body 2 and includes the fixing members 23 that fix the wide bag body 21 to the front part of the vehicle body 2, at least at two positions in the vehicle width direction. With this structure, the bag body 21 in the state of wrapping the person outside the vehicle retains the person outside the vehicle, who is about to move rearward or the like subsequently, at the inside part of the bag body 21 expanded over the hood 5.

In addition, in the top view of the vehicle body 2 in FIG. 6A, the tether 22 is configured to extend along the vehicle width direction on the upper surface of the expanded wide bag body 21, in the area rearward of the positions where the bag body 21 is fixed by the fixing members 23. Thus, although being fixed relative to the vehicle body 2, the wide bag body 21 functions so as to wrap the person outside the vehicle falling thereover in accordance with bending of the tether 22 on the rearward side of the fixed positions of the fixing members 23.

In this embodiment, the both ends of the tether 22 in the wide bag body 21 is provided on the upper surface of the bag body 21 in the state of being coupled to the fixing members or being in the vicinity of the fixing members 23. In addition, the center part of the tether 22 in the wide bag body 21 is configured to be positioned rearward above the both ends on the upper surface of the bag body 21 that is widely expanded. The tether 22 is configured to extend along the vehicle width direction in a curved state in which the center part is positioned rearward above the both ends. This makes the tether 22 easily bend so that the right and left parts will meet each other in response to the person outside the vehicle falling over the bag body 21. The weight of the person outside the vehicle easily acts on the center part of the tether 22. The weight of the person outside the vehicle falling over the bag body 21 acting on the center part makes the tether 22 easily bend in such a manner that the bag body 21 wraps the person outside the vehicle, from right and left.

The above embodiment is a mere example of the disclosure. It is noted that the disclosure is not limited to the above embodiment. Various modifications and changes may be made without departing from the gist of the disclosure.

For example, in the above-described embodiment, the tether 22 is coupled to the paired right and left fixing members 23 at the both ends. The tether 22 has a fixed length.

In another example, the tether 22 may be provided so that the length between the paired right and left fixing members 23 can be changed in accordance with the expanded state of the bag body 21.

Figure 9:
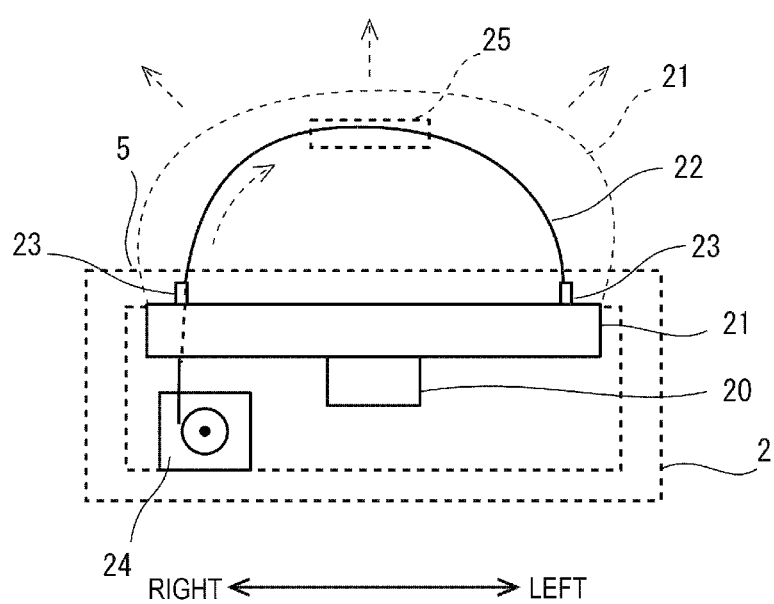
FIG. 9 is a diagram of the bag body of the exterior airbag device according to a first modification of the embodiment.

FIG. 9 is a diagram of the bag body 21 of the exterior airbag device 17 according to a first modification of the embodiment.

In FIG. 9, the tether 22 is coupled to a winding device 24, which is provided at a lower part of the vehicle body 2, via a through hole of the right fixing member 23. In addition, a guide 25 is provided at the center of the upper surface of the bag body 21. The guide 25 may be formed by attaching a rectangular cloth on the inner surface of the bag body 21. The tether 22 passes through the guide 25.

The winding device 24 freely sends out the tether 22 in accordance with expansion of the wide bag body 21 before collision occurs. In addition, the winding device 24 inhibits further drawing out of the tether 22 after expansion of the bag body 21 starts or the bag body 21 is expanded to the maximum. The winding device 24 may slightly draw in the tether 22, instead of stopping drawing out of the tether 22.

In such a modification, the tether 22 is set inside the wide bag body 21 by being sent out from the winding device 24 in accordance with expansion of the wide bag body 21. Thus, the tether 22 extends along the upper surface of the bag body 21, even when the bag body 21 is still not widely expanded to the maximum. Even when a person outside the vehicle falls over the bag body 21 that is still not expanded to the maximum, the tether 22 is bent in the state in which its center part is maintained at a position rearward above its both ends. Even when the weight of the person outside the vehicle falling over the bag body 21 acts before the bag body 21 is expanded to the maximum, the tether 22, which is maintained at a predetermined position, makes the bag body 21 function so as to bend from right and left.

In particular, the winding device 24 inhibits further drawing out of the tether 22 after expansion of the bag body 21 starts or the bag body 21 is expanded to the maximum. Thus, while the weight of the person outside the vehicle acts on the tether 22, the length of the tether 22 is prevented from being further long. The tether 22 in which the length is thus limited functions to exert various effects in the above-described embodiment.

In contrast, for example, if the tether 22 can be drawn out from the winding device 24 while the weight of a person outside the vehicle acts on the tether 22, the length of the tether 22 inside the wide bag body 21 varies in accordance with the weight that acts on the tether 22. In this case, the tether 22 hardly functions to exert various effects in the above-described embodiment.

In the above-described embodiment, one tether 22 is provided on the upper surface of the bag body 21.

In another example, a plurality of tethers 22 may be provided on the upper surface of the bag body 21.

In the above-described embodiment, the bag body 21 is expanded in the state of having a width slightly narrower than the vehicle body 2.

In another example, the bag body 21 may be expanded in the state of having the same width as the vehicle body 2 or may be expanded in the state of having a width wider than the vehicle body 2. In each case, the bag body 21 is expanded in the state of having a width corresponding to the vehicle width of the vehicle body 2 so as to be wider than the width of the body of a person outside the vehicle or the like. Thus, the bag body 21 is expected to wrap a person outside the vehicle falling thereover.

In the disclosure, the exterior airbag device is expanded when the collision detector predicts or detects contact. The exterior airbag device expands the bag body, which is expandable while having a wide width corresponding to the vehicle width of the vehicle body, over the hood of the outer surface of the vehicle body. This enables avoiding a direct collision of a person outside the vehicle with the hood of the vehicle body and absorbing impact acting on the person outside the vehicle who is falling over to the hood.

Moreover, the flexible crossing member is configured to extend along the vehicle width direction on the upper surface of the wide bag body, which is expanded to overlie the hood of the vehicle body. In response to falling of the person outside the vehicle over the expanded wide bag body, the forward part of the bag body is recessed by the weight of the human body. In reaction to this, the part of the bag body on the rearward side of the flexible crossing member easily deforms to further swell. Thus, the widely expanded bag body on the rearward side of the flexible crossing member greatly swells behind the person outside the vehicle falling thereover and wraps the person outside the vehicle from behind. For example, when the part of the bag body is further recessed upon further receiving the weight of the person outside the vehicle, the flexible crossing member easily deforms in such a manner as to be folded from right and left so that the right and left of the part receiving the weight will meet each other above the person outside the vehicle. In this case, the widely expanded bag body wraps the person outside the vehicle falling thereover, from right and left, at the right and left of the part receiving the weight. As a result, the person outside the vehicle, who has fallen over the bag body, is wrapped by the bag body, and the person outside the vehicle in this state stops moving on the bag body. After falling over the bag body that is widely expanded over the hood, the person outside the vehicle is wrapped by the bag body, resulting in hardly moving and falling off in the right-left direction of the vehicle body.

The controller 18 illustrated in FIG. 2 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the controller 18 illustrated in FIG. 2. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the controller 18 illustrated in FIG. 2.

The invention claimed is:

1. An exterior protection apparatus for a vehicle, the exterior protection apparatus comprising:
    an exterior airbag device comprising
        a bag body comprising fixing members that fix the bag body to a front part of a vehicle body and configured to be widely expanded rearward from the front part of the vehicle body, over a hood of the vehicle,
        an inflator configured to expand the bag body over the hood of the vehicle body of the vehicle in a state of having a width corresponding to a vehicle width of the vehicle body of the vehicle; and
        a flexible crossing member configured to extend along a direction of the vehicle width on an upper surface of the bag body widely expanded;
    a collision detector configured to predict or detect a collision between the vehicle body and a person outside the vehicle; and
    a controller configured to cause the bag body of the exterior airbag device to be expanded in a case where the collision detector predicts or detects the collision, wherein
    both ends of the flexible crossing member inside the bag body are provided on the upper surface of the bag body so as to be coupled to the fixing members or be in a vicinity of the fixing members, and
    a center part of the flexible crossing member inside the bag body is configured to be positioned rearward above the both ends on the upper surface of the bag body widely expanded.

2. The exterior protection apparatus for a vehicle according to claim 1, wherein
    the flexible crossing member is configured to, when a load acts from a forward side of the vehicle body on the bag body widely expanded, bend in such a manner that right and left of a part receiving the load meet each other on a forward side of the part receiving the load.

3. The exterior protection apparatus for a vehicle according to claim 2, wherein
    the flexible crossing member is configured to extend along the direction of the vehicle width, on a side rearward of a head of the person outside the vehicle who falls from a forward side of the vehicle body over the bag body widely expanded.

4. The exterior protection apparatus for a vehicle according to claim 2, wherein
    the flexible crossing member comprises a tether, and
    the tether as the flexible crossing member is configured to be set inside the bag body by being sent out from a winding device in accordance with expansion of the bag body.

5. The exterior protection apparatus for a vehicle according to claim 4, wherein
    the winding device is configured to inhibit further drawing out of the tether or draw in the tether after expansion of the bag body starts or the bag body is expanded to a maximum.

6. The exterior protection apparatus for a vehicle according to claim 1, wherein
    the flexible crossing member is configured to extend along the direction of the vehicle width, on a side rearward of a head of the person outside the vehicle who falls from a forward side of the vehicle body over the bag body widely expanded.

7. The exterior protection apparatus for a vehicle according to claim 1, wherein
the flexible crossing member comprises a tether, and
the tether as the flexible crossing member is configured to be set inside the bag body by being sent out from a winding device in accordance with expansion of the bag body.

8. The exterior protection apparatus for a vehicle according to claim 7, wherein
the winding device is configured to inhibit further drawing out of the tether or draw in the tether after expansion of the bag body starts or the bag body is expanded to a maximum.

9. An exterior protection apparatus for a vehicle, the exterior protection apparatus comprising:
an exterior airbag device comprising
a bag body comprising fixing members that fix the bag body to a front part of a vehicle body and configured to be widely expanded rearward from the front part of the vehicle body, over a hood of the vehicle,
an inflator configured to expand the bag body over the hood of the vehicle body of the vehicle in a state of having a width corresponding to a vehicle width of the vehicle body of the vehicle; and
a flexible crossing member configured to extend along a direction of the vehicle width on an upper surface of the bag body widely expanded;
a collision detector configured to predict or detect a collision between the vehicle body and a person outside the vehicle, the collision detector including at least a camera or a sensor for detecting contact between the vehicle body and the person; and
circuitry configured to cause the bag body of the exterior airbag device to be expanded in a case where the collision detector predicts or detects the collision, wherein
both ends of the flexible crossing member inside the bag body are provided on the upper surface of the bag body so as to be coupled to the fixing members or be in a vicinity of the fixing members, and
a center part of the flexible crossing member inside the bag body is configured to be positioned rearward above the both ends on the upper surface of the bag body widely expanded.

10. An exterior protection apparatus for a vehicle, the exterior protection apparatus comprising:
an exterior airbag device comprising
a bag body,
an inflator configured to expand the bag body over a hood of a vehicle body of the vehicle in a state of having a width corresponding to a vehicle width of the vehicle body of the vehicle, and
a tether configured to extend along a direction of the vehicle width on an upper surface of the bag body widely expanded;
a collision detector configured to predict or detect a collision between the vehicle body and a person outside the vehicle; and
a controller configured to cause the bag body of the exterior airbag device to be expanded in a case where the collision detector predicts or detects the collision, wherein
the tether is configured to be set inside the bag body by being sent out from a winding device in accordance with expansion of the bag body.

11. The exterior protection apparatus for a vehicle according to claim 10, wherein
the winding device is configured to inhibit further drawing out of the tether or draw in the tether after expansion of the bag body starts or the bag body is expanded to a maximum.

\* \* \* \* \*